United States Patent
Nazaryan et al.

(12) 
(10) Patent No.: US 6,284,322 B1
(45) Date of Patent: Sep. 4, 2001

(54) LOW-FRICTION COATING COMPOSITION

(75) Inventors: Nikolay Nazaryan, West Hartford; Stanley S. Orkin, Vernon; Glen Greenberg, Avon, all of CT (US)

(73) Assignee: Turbine Controls, Inc., Bloomfield, CT (US)

( * ) Notice: Subject to any disclaimer, the term of this patent is extended or adjusted under 35 U.S.C. 154(b) by 0 days.

(21) Appl. No.: 09/413,566

(22) Filed: Oct. 6, 1999

(51) Int. Cl.$^7$ ................................................. B05D 3/02
(52) U.S. Cl. ...................... 427/386; 508/108; 523/458; 523/459
(58) Field of Search .................... 523/458, 459; 508/108; 427/386

(56) References Cited

U.S. PATENT DOCUMENTS

| | | | |
|---|---|---|---|
| Re. 29,092 | 12/1976 | Schiefer et al. | 252/12.4 |
| 4,927,715 | 5/1990 | Mori | 428/645 |
| 4,996,085 | 2/1991 | Sievers | 427/140 |
| 5,219,956 | 6/1993 | Fukuoka | 525/526 |
| 5,239,955 | 8/1993 | Rao et al. | 123/193.4 |
| 5,313,919 | 5/1994 | Rao et al. | 123/193.4 |
| 5,316,790 | 5/1994 | Chan et al. | 427/142 |
| 5,344,515 | 9/1994 | Chenock, Jr. | 156/171 |
| 5,554,020 | 9/1996 | Rao et al. | 418/178 |

FOREIGN PATENT DOCUMENTS

| | | |
|---|---|---|
| 07247493 | * 9/1995 | (JP) . |
| 08092487 | * 4/1996 | (JP) . |

OTHER PUBLICATIONS

Svirldenok et al., Trenie Iznos (1986), 7(1), pp 156–160 Abstract.*
Franklin Industrial Minerals Typical Property Data Sheet L–135 for Dry Flake Muscovite Mica.
Franklin Industrial Minerals Typical Property Data Sheet H360 for Wet Ground Muscovite Mica.
Franklin Industrial Minerals Material Safety Data Sheet for Various Wet Ground Mica and Dry Ground Mica.
DuPont Product Information Sheet ZONYL ® MP1000 fluroropolymer resin (fluoroadditive).
Dow Corning Product Information Sheet Z Moly–Powder molybdenum disulfide.
DuPont Technuical Information Bulletin TF–7 for TEFLON® PTFE, fluorocarbon fiber.
Ciba Specialty Chemicals Product Data Sheet for ARALDITE® RD–2 di–Epoxide Reactive Diluent.
Ciba Specialty Chemicals Material Safety Data Sheet for ARALDITE® RD–2 Epoxy Resin Reactive Diluent.
Dexter Electronic Materials Division Technical Information Bulletin for HYSOL SR1000, SR1010.
Dexter Electronic Materials Division Material Safety Data Sheet for HYSOL SR1000.
Dexter Aerospace Materials Division Product Bulletin for HYSOL EA 929NA.
Dexter Aerospace Material Safety Data Sheet for HYSOL EA 929NA.
HP Polymer Inc., High Performance Polymers Information Packet.
HP–Polymer EU–Material Safety Data Sheet.
Dexter Aerospace Materials Safety Data Sheet for HYSOL EA 9369 QT.
Dexter Aerospace Materials Division Information Leaflet for HYSOL EA 9369.

* cited by examiner

Primary Examiner—Robert Dawson
Assistant Examiner—D. Aylward
(74) Attorney, Agent, or Firm—Todd E. Garabedian; William A. Simons

(57) ABSTRACT

The present invention is directed to a low friction coating composition, comprising (1) about 60 wt% to about 95 wt % of a high temperature epoxy; (2) about 1 wt % to about 30 wt % of molybdenum disulfide; and (3) about 1 wt % to about 20 wt % of polyimide powder, all based on the total weight of the coating composition. The present invention is also directed to a substrate coated with the low friction coating composition of the invention, and a method of coating a substrate with the low-friction coating composition of the invention.

15 Claims, No Drawings

LOW-FRICTION COATING COMPOSITION

BACKGROUND OF THE INVENTION

1. Field of the Invention

The present invention relates to a low-friction coating composition, and more particularly to a low friction coating composition, comprising an admixture of (1) a high temperature epoxy, (2) molybdenum disulfide powder, and (3) a polyimide powder. The present invention is also directed to a substrate coated with the low-friction coating composition of the invention, and a method of coating a substrate with the low-friction coating composition of the invention.

2. Brief Description of the Art

Low-friction coatings are useful in a wide variety of industrial applications to provide movable linkages or reciprocating parts with a low friction interface without the need for lubrication by grease, oil, or other lubricant. Low-friction coating compositions also provide high load capability with lower resistance than exhibited by metal/metal bearing contact, as well as having a relatively long life. In particular, low friction coatings have proven useful in aircraft and other industrial equipment, where severe operating conditions can occur. For example, aircraft fuel and oil pump mechanisms require repair because their gear drive bushings wear away during use. This wear (called "galling" or "scoring" or "gear wiping") limits the longevity of the pump mechanism and results in costly rebuilding, repair, or replacement of the moving components of the mechanisms. Low-friction coating compositions have also been used on reciprocating parts, such as engine pistons, where a low-friction interface between the reciprocating part and its housing is required for optimum performance.

Under extreme conditions, the wear resistance of a low-friction or self-lubricating coating composition becomes a key factor in how that coating composition performs in any particular application. Many low-friction or self-lubricating compositions available today do not have the wear resistance properties that are required for modern high-performance machinery parts made under close tolerances. Lack of wear-resistant properties in commercially available low friction coating compositions frequently results in premature degradation of the low-friction or self-lubricating coating. Without a wear resistant low friction coating, moving parts and/or linkages suffer accelerated wear which can result in costly replacement or complete failure of the parts. Therefore, efforts have been made to improve the wear resistance of low-friction or self-lubricating coatings.

U.S. Pat. No. 4,996,085 discloses coating a pump housing surface with a composition comprising a hardenable epoxy resin, a reinforcing filler, and an agent having a lower coefficient of friction than the epoxy resin. Graphite may function as the reinforcing filler, and the frictional reducing agent may be either graphite, in fibrous or granulated form; fluorinated carbon (i.e., —($CF_x$)—wherein x<2); or molybdenum disulfide. Further, the preferred class of epoxy resin is a diglycidyl ether of a dihydric phenol (e.g., the diglycidyl ether of bisphenol A).

U.S. Pat. No. 5,316,790 discloses a lubricative coating and filler material for restoring metal surfaces that have become scratched, scored, grooved, or otherwise damaged to a functional condition. This coating and filler material is a mixture of an epoxy resin, tungsten disulfide, and isopropyl alcohol in a ratio of 9:1:1.6.

U.S. Pat. No. 5,554,020 to Rao et al. discloses a high efficiency pump having relatively-moving parts constituted of a light weight material and a coating on at least one of the parts. The coating is comprised of solid lubricants in a polymer resin matrix stable up to 700° F. The solid lubricant may be graphite, molybdenum disulphide, boron nitride, tungsten disulphide, or polytetrafluoroethylene (PTFE). The resin matrix may be one of polyimides, epoxy, or polyaryl sulphone.

U.S. Ser. No. 09/183,859 discloses a curable composition useful as a self-lubricating coating and comprising an admixture of:

(1) 40–60 wt % of a first one-component epoxy resin composition, comprising:
  (a) about 10–30% by weight of 4-gylcidyloxy, n,n-diglycidyl aniline;
  (b) about 30–60% by weight of an epoxy resin (an epichlorohydrin ether of bisphenol A); and
  (c) about 3–7% by weight of strontium chromate;

(2) 5–20 wt % of a second one-component epoxy resin composition, comprising:
  (a) about 50% to about 90% by weight of an epoxy resin (a diglycidyl ether of bisphenol A);
  (b) about 5% to about 25% by weight of diethylene glycol monoethyl ether acetate; and
  (c) about 5% to about 25% by weight of p-t-butylphenyl glycidyl ether;

(3) 2–30 wt % of di-epoxide reactive diluent;

(4) 2–20 wt % polytetrafluoroethylene;

(5) 2–20 wt % molybdenum disulfide; and (6) 0.5–13 wt % mica.

The preferred self-lubricating composition disclosed by U.S. Ser. No. 09/183,859 comprises: (1) about 40% to about 60% by weight of HYSOL EA 929NA epoxy resin composition; (2) about 5% to about 20% by weight HYSOL SR1000 high solids epoxy resin/solvent mixture; (3) about 2% to about 30% by weight of ARALDITE RD-2 di-epoxide reactive diluent; (4) about 2% to about 20% of ZONYL MP1000 polytetrafluoroethylene powder; (5) about 2% to about 20% by weight molybdenum disulfide powder; and (6) and about 0.5% to about 13% H360 wet ground mica.

Copending U.S. Ser. No. 08/568,114 discloses a curable composition useful for repairing worn surfaces on housings comprising an admixture of (1) a mixture of (a) at least one one-component epoxy resin, (b) at least one solvent and (c) at least one reactive diluent, wherein the epoxy resin is present in a major (i.e., at least 50% by weight) amount in the mixture; (2) graphite powder; and (3) polytetrafluoroethylene powder.

While these coating materials may be satisfactory for certain applications, there is still need for improved low-friction coating compositions that have high wear resistance, and that are useful for a wide variety of applications including pump housings and mechanisms, pistons, or other types of reciprocating parts where high wear resistance is required. The present invention is believed to be an answer to that need.

BRIEF SUMMARY OF THE INVENTION

In one aspect, the present invention is directed to a low friction coating composition, comprising:

A. about 60 wt % to about 95 wt % of a high temperature epoxy, comprising
  1. about 30 wt % to about 60 wt % of N,N'-m-phenylene dimaleimide;
  2. about 30 wt % to about 60 wt % of bisphenol epoxy resin; and 3. about 1 wt % to about 5 wt % of amorphous silicon dioxide;

B. about 1 wt % to about 30 wt % of molybdenum disulfide; and

C. about 1 wt % to about 20 wt % of polyimide powder.

In another aspect, the present invention is directed to a substrate coated with the low friction coating composition of the invention.

In yet another aspect, the present invention is directed to a method of coating a substrate with a low-friction coating composition, comprising the steps of (A) coating a substrate with the above low-friction coating composition; and (B) curing the low-friction coating composition onto the substrate at a temperature of between 350 and 500° F. for 0.5–5 hours.

These and other aspects will become apparent from the following written description.

DETAILED DESCRIPTION OF THE INVENTION

The present invention offers a solution to the problem of low-friction coating compositions with insufficient wear resistance. The present inventors have unexpectedly found that a low-friction coating composition made from a combination of a high temperature epoxy resin, molybdenum disulfide, and polyimide powder provides excellent wear resistance as well as a low-friction interface between parts. The improved wear resistance exhibited by the low-friction coating composition of the invention reduces premature degradation of the low-friction or self-lubricating coating, and thereby improves the longevity of the coating.

As mentioned above, the present invention is a low-friction coating composition, comprising (A) about 60 wt % to about 95 wt % of a high temperature epoxy component, (B) about 1 wt % to about 30 wt % of molybdenum disulfide; and (C) about 1 wt % to about 20 wt % of a polyimide powder component. Each of these components are discussed below.

The high temperature epoxy component of the composition of the present invention is preferably HYSOL EA 9369 epoxy resin available as a paste from Dexter Aerospace Materials (a division of Hysol Aerospace Products, Pittsburg, Calif.). As used herein, the phrase "high temperature" refers to acceptable structural integrity, wear, and strength at temperatures greater than about 350° F. The HYSOL EA 9369 epoxy resin mentioned above contains 30–60 wt % of N,N' -m-phenylene dimaleimide (CAS No. 3006–93–7); 30–60 wt % of bisphenol F epoxy resin; and 1–5 wt % of amorphous silicon dioxide (CAS No. 112945- 52- 5). This product is a one component modified bismaleimide paste adhesive with structural performance to about 550° F.

The preferred molybdenum disulfide component of the composition of the present invention is Dow Corning Z Moly-Powder molybdenum disulfide powder available from Dow Corning (Midland, Mich.). The particle sizes of the molybdenum disulfide powder used in the present invention preferably range from 1.2 to 62 microns.

The preferred polyimide powder component of the present invention is P84 Polyimide powder (VPD grade, 325 mesh) available from HP Polymer Inc. (Lewisville, Tex.). This material is also available under the tradename ALTYMID 385 from Greene, Tweed & Co., and in Europe as LENZING P84 Powder available from HP-Polymer GmbH.

The low-friction coating composition of the invention contains from about 60 wt % to about 95 wt % of HYSOL EA 9369 high temperature epoxy, about 1 wt % to about 30 wt % of molybdenum disulfide, and about 1 wt % to about 20 wt % of the P84 Polyimide powder (VPD grade), all percentages based on total weight of the composition. More preferably, the low-friction coating composition of the invention contains from about 65 to about 92 wt % of HYSOL EA 9369 high temperature epoxy, about 5 to about 20 wt % molybdenum disulfide powder, and about 3 to about 15 wt % of the P84 Polyimide powder (VPD grade). Most preferably, the low-friction coating composition of the invention contains about 80 to about 90 wt % of HYSOL EA 9369 high temperature epoxy, about 8 to about 12 wt % molybdenum disulfide powder, and about 3 to about 8 wt % of the P84 Polyimide powder (VPD grade). One preferred composition of the invention comprises about 85 wt % of HYSOL 9369 high temperature epoxy, about 10 wt % molybdenum disulfide powder, and about 5 wt % of P84 polyimide powder (VPD grade).

In some applications, such as spray applications described below, it may be advantageous to thin the low-friction coating composition of the invention with a solvent prior to application. A useful solvent for this purpose is a combination of 10–40 wt % methyl isobutyl ketone and 60–90 wt % propylene glycol monomethyl ether. Such a solvent is sold by Dexter Electronic Materials under the tradename AD2002 Thinner. A useful alternative solvent is methylene chloride. The amount of solvent useful in the composition of the present invention generally depends on factors such as desired evaporation rate, type of spraying or other application equipment, desired thickness of the applied coat, and the like understood and easily determined by those of skill in the art. Nonlimiting useful amounts of solvent useful in the composition of the present invention solvents generally range from about 10 wt % to about 90 wt %, based on the total weight of the composition. Amounts of solvent may also be used outside this preferred range if the particular application so demands.

Other fillers such as graphite powder, fiberglass fibers, or polytetrafluoroethylene (TEFLON) in powder or fiber form may be optionally added in amounts from 0 to about 5% by weight of the admixture. The composition may also optionally contain color additives, metal powders, or both. If it is desirable to use a metal powder, then silver powder, copper powder or aluminum powder as well as tungsten selenide, tantalum sulfide, molybdenum diselenide and boron nitride in amounts from about 0.5% to 20% of the composition may be used to achieve different low-friction and wear reducing characteristics for specific applications.

To prepare the composition, the above materials, as well as any optional ingredients, are preferably mixed together at ambient temperature to form a liquid slurry. Air may be removed from the slurry by mixing under a vacuum. The amount of solvent, if any, added to the slurry is easily determined by those skilled in the art based on the viscosity required for the spray equipment.

The low-friction composition may be applied to a variety of substrates such as stainless steel, titanium alloys, aluminum alloys, carbon steel, as well as magnesium and brass alloys. Also, non-metallic substrates such as plastics may be used as substrates. One family of preferred substrates is a magnesium or a stainless steel aircraft fuel or oil pump housing. Besides its preferred use on pump housings, the low friction coating composition of the invention may also be used to coat new parts or repair housing parts on pistons, gear boxes, cover assemblies, valve bodies, actuators, cylinders, shafts, bearings, impellers and journals.

In order to ensure sufficient bondability and repeatability of the desired products of the coated substrate, metal substrate surfaces to be coated are preferably cleaned and then roughened by grit blasting with a media sufficient to produce surface roughness of 250 RMS (root-mean-square) without exaggerating the peaks and valleys of the undamaged or damaged surface. If grit blasting is employed, the surface is also preferably scrubbed before coating with the composition of the present invention to remove any embedded grit media. The roughened surface may also be preferably subjected to a chemical cleaning before the coating operation.

The low-friction composition of the invention may be applied by brush, spatula, spray, low pressure transfer, or other suitable application method. Preferably, the amount of low-friction coating composition slurry applied to the substrate is in the range of 0.020 inch to about 0.050 inch in thickness when wet.

After being applied, the low-friction composition that is applied to the substrate is cured by heating the coated substrate to suitable curing temperature for a sufficient amount of time. In order to achieve the high wear resistance that is provided by the composition of the present invention, preferred curing temperatures are from about 350 to about 500° F., and more preferably about 475° F., for between 0.5 and 5 hours. The cured coating composition may then be machined to a desired thickness or shape.

The low-friction coating composition of the present invention offer several significant commercial advantages. The compositions are inexpensive to prepare, and are useful in a wide variety of applications where high wear resistance of a low-friction coating is required. The compositions can be applied by simple procedures, such as spatula or spraying using common equipment and methods. The compositions are also compatible with a wide variety of substrate materials and configurations, and they have the ability to be machined by either conventional single point tooling, grinding, honing or polishing operations. Furthermore, the viscosity of the compositions of the present invention can easily be adjusted by varying the amounts of the individual components or by addition of solvent. The compositions of the present invention also do not require bonding pressures to ensure excellent adhesion to substrates and high load capability.

Since the composition of present invention is in a slurry state before being cured, it can be readily applied onto any surface, including inner diameters and spherical surfaces. For simple shapes, these compositions can be molded into a solid form on a substrate or machined from a solid bar on a substrate into the desired final configuration. For larger surfaces, these compositions may be sprayed onto a substrate and then cured.

The following Examples are provided to better illustrate the present invention. All parts and percentages are by weight and all temperatures are degrees Celsius, unless explicitly stated otherwise.

EXAMPLES

Example 1
Preparation of Low-Friction Coating Composition 25 grams of the low-friction coating composition was prepared using the components shown in Table I

TABLE I

| Component | Weight (g) | Wt % |
|---|---|---|
| HYSOL EA9369 epoxy resin | 21.25 | 85 |

TABLE I-continued

| Component | Weight (g) | Wt % |
|---|---|---|
| Z Moly-Powder molybdenum disulfide | 2.5 | 10 |
| P84 polyimide powder (VPD grade) | 1.25 | 5 |

In Table I, the weight percents are based on the total weight of the composition. The materials were thoroughly mixed together by hand for 10 to 15 minutes in a stainless steel crucible. The mixture was then placed in a Bell jar and subjected to a vacuum (about 29 inches Hg) for about 5 minutes to remove any air trapped within the mixture.

A stainless steel washer (approximately 1 inch diameter and 0.5 inch thick) was grit blasted using aluminum oxide grit, and then cleaned with a chemical cleaner. Following cleaning, the washer was warmed to 120° F., and the above low-friction coating composition was applied to the substrate with a spatula to a thickness of about 0.030 inch. The coated washer was again subjected to a vacuum (about 29 inches Hg in a Bell jar) for about 2 minutes. The coated part was removed from the vacuum, and cured in a convection oven at 475° F. for about two hours. The cured coated washer was then machined in a single operation to achieve a coating thickness of about 0.010 inch.

The parts coated with the composition of the invention were determined to have a hardness of 98 on the 15X range of the Superficial Rockwell Hardness scale (and excluding hardness influences of the substrate itself). In addition, the cured coating has an operating temperature range of from about −60° F. to about +500° F., and operating pressures in excess of 10,000 psi.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A low friction coating composition, comprising:
   A. about 60 wt % to about 95 wt % of a high temperature epoxy, comprising
      1. about 30 wt % to about 60 wt % of N,N'-m-phenylene dimaleimide;
      2. about 30 wt % to about 60 wt % of bisphenol epoxy resin; and
      3. about 1 wt % to about 5 wt % of amorphous silicon dioxide;
   B. about 1 wt % to about 30 wt % of molybdenum disulfide; and
   C. about 1 wt % to about 20 wt % of polyimide powder; wherein all weight percents are based on the total weight of the composition.

2. The low friction coating composition of claim 1, wherein said high temperature epoxy component comprises from about 65 to about 92 wt %.

3. The low friction coating composition of claim 2, wherein said high temperature epoxy component comprises from about 80 to 90 wt %.

4. The low friction coating composition of claim 1, wherein said molybdenum disulfide component comprises from about 5 to about 20 wt %.

5. The low friction coating composition of claim 4, wherein said molybdenum disulfide component comprises from about 8 to about 12 wt %.

6. The low friction coating composition of claim 1, wherein said polyimide powder component comprises from about 3 to about 15 wt %.

7. The low friction coating composition of claim 6, wherein said polyimide powder component comprises from about 3 to about 8 wt %.

8. The low friction coating composition, further comprising a solvent.

9. The low friction coating composition of claim 8, wherein said solvent comprises from about 10 wt % to about 90 wt %, based on the total weight of the composition.

10. The low friction coating composition of claim 8, wherein said solvent comprises an admixture of methyl isobutyl ketone and propylene glycol monomethyl ether.

11. The low friction coating composition of claim 8, wherein said solvent is methylene chloride.

12. A substrate coated with the low friction coating composition of claim 1.

13. The substrate of claim 12, wherein said substrate is selected from the group consisting of stainless steel, titanium alloys, aluminum alloys, carbon steel, magnesium alloys, brass alloys, plastics, and combinations thereof.

14. A method of coating a substrate with a low-friction coating composition, comprising the steps of:
   A. coating said substrate with the low-friction coating composition of claim 1; and
   B. curing said low-friction coating composition onto said substrate at a temperature of between 400 and 500° F. for 1–3 hours.

15. The method of claim 14, wherein said curing step occurs at between about 350° F. to about 500° F. for between 0.5 and 5 hours.

* * * * *